No. 795,831. PATENTED AUG. 1, 1905.
T. E. HARLEY.
SEALING DEVICE FOR VESSELS.
APPLICATION FILED FEB. 7, 1903.
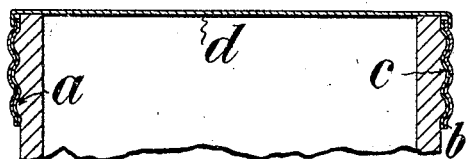
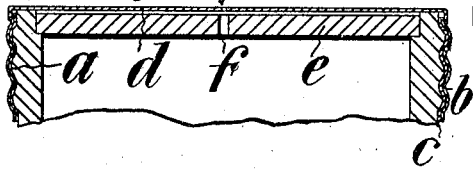
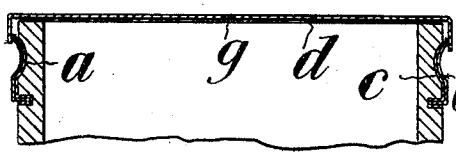
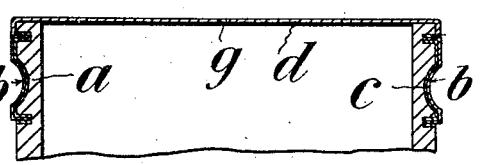
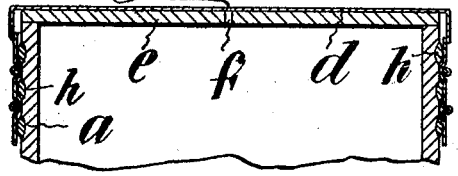
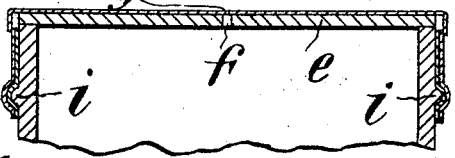
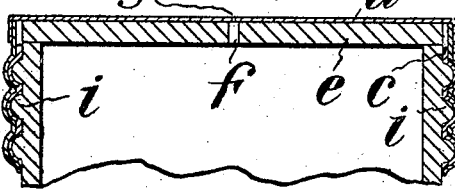

UNITED STATES PATENT OFFICE.

THOMAS EVANS HARLEY, OF MANCHESTER, ENGLAND.

SEALING DEVICE FOR VESSELS.

No. 795,831.  Specification of Letters Patent.  Patented Aug. 1, 1905.

Application filed February 7, 1903. Serial No. 142,366.

*To all whom it may concern:*

Be it known that I, THOMAS EVANS HARLEY, a subject of the King of Great Britain, and a resident of Moss Side, Manchester, England, have invented certain new and useful Improvements in Sealing Devices for Vessels, of which the following is a specification.

This invention consists in fastening, by means of cement, rubber, or other suitable jointing material, a metal collar, hoop, or band round the grooved outside of the mouth of a vessel made of earthenware, glass, or similar material, the said collar, hoop, or band being made to conform with the grooved outside of the mouth, so as to lock therewith, the cement forming an air-tight joint between the vessel's mouth and the collar, and then hermetically closing the vessel by soldering a flanged "tin" lid onto the upper outside part of the collar in the way that such lids are now soldered to the tin vessels in common use for preserving alimentary substances. It will thus be understood that by my invention I obtain not only the advantages of the vessels made of earthenware, glass, and the like, which do not (as the tins in common use are apt to) impair the flavor or otherwise deleteriously affect the alimentary or other substances contained in such vessels; but I also obtain and combine therewith the advantages of the tins in common use, because the mode of effecting the closing up or sealing up of the vessel is similarly, and therefore as easily and cheaply, performed as with them.

In the accompanying drawings I have illustrated various means for carrying out my invention, in which—

Figure 1 is a vertical section of the closure device for the upper part of a vessel of earthenware, glass, or the like; Fig. 2, a like section of another form with the lid separate; Fig. 3, a similar view with the lid secured. Figs. 4 to 11 are like sections of modifications. Fig. 12 is a perspective view showing one form of an unbroken metallic collar which forms an essential feature of my invention.

Fig. 1 shows the upper part of a vessel of earthenware, glass, or the like formed with outside screw-thread $a$, as now in common use with wide-mouthed glass vessels intended to take a screw-threaded metal cap. A collar or band $b$ is made by cutting a strip of thin ordinary tin (tinned iron) or other suitable metal. The ends are brought together and soldered to fit easily round the mouth of the vessel. This metal collar is screw-threaded to correspond with the thread on the mouth of the vessel. The threads on the mouth of the vessel are filled with suitable cement or luting material and the collar screwed on till its upper edge is about flush with the brim of the vessel. More cement or luting material is then worked in between the vessel and the collar and is dressed off to complete a neat and air-tight joint. The space $c$ indicates the cement or luting material. I find it advantageous to give the collar $b$ a coating of white-lead paint on the inner side, as it makes the cement adhere better thereto. A tin lid $d$ is finally soldered onto the collar $b$, as shown. The vessel has generally also an inner lid $e$, as shown in Fig. 2. This lid is made of earthenware, glass, or the like and serves to prevent as far as possible the contents of the vessel coming in contact with the outer lid. The inner lid $e$ is made to rest in a recess or bed formed on the inner circumference of the vessel $a$, so as to be flush with the brim thereof, as is now usual. This lid or disk $e$ has a small hole $f$ in the center to allow the steam to escape freely before finally closing the outer lid $d$ when "canning" or preserving by the hot process. As an alternative the narrow recess or bed for the inner lid $e$ may be dispensed with and the lid be so much larger as to rest on the top of the vessel. The lid $e$ may be of earthenware, glass, or the like, as stated, or it may be of cork and made to fit into the mouth of the vessel as a bung, or it may be of wood or other suitable material. In these cases the vessel may be made slightly conical where the lid fits in it. The outer lid $d$ is made of ordinary tin or other suitable metal and is fixed to the collar $b$ by soldering. The usual central pinhole $g$, Fig. 3, corresponds with the small hole $f$ in the inner lid $e$. It is thus made apparent that many of the glass jars or bottles at present in common use having screw-threaded mouths (for being fitted with screw-threaded metal caps) could be utilized under my invention by fixing thereto my screw-threaded collar or hoop $b$ and soldering thereto the outer lid $d$, while employing also an inner lid, such as $e$, either on the top of the rim of the vessel or in the recessed or plain or coned mouth thereof.

Another variation of form is shown in Fig.

4, where instead of the mouth of the vessel being screw-threaded, as above described, I provide the vessel with a groove or two or more such running round the outside. These grooves are somewhat similar to the single groove generally made in the ordinary jam-jars for the tying on of the paper covers, but preferably deeper and wider. The exact shape is not very material. The band $b$ is cut the proper length so that when the two ends are brought together and soldered it fits somewhat tightly around the mouth of the vessel. The grooves in the vessel are filled with cement, and the collar $b$ is put on so that its upper edge comes about flush with the brim of the vessel. It is then pressed circumferentially with a suitable blunt tool, so as to enter the grooves, and may be wired on for additional security, if required. More cement or luting material is then worked in between the vessel and the collar, and an air-tight joint or seal is thus produced between the vessel and the collar. Figs. 5 and 6 show two other forms of grooving of the vessel, the collar $b$ being formed to suit. The forms of grooving the vessel may of course vary beyond the examples given, the collar or band in all cases being formed to suit. Instead of cement or other luting material in the grooves I may use rings of india-rubber or other suitable yielding material therein, as shown in Fig. 7, where, as an example, three rubber rings $h$ are placed in annular recesses of the vessel, or, as shown in Fig. 8, I use a collar $c$, of thin sheet india-rubber, fitted tightly round the mouth, so as to cover the grooves. The collar $b$ is then put on and pressed circumferentially into the grooves and may be furthermore secured by means of wires $j$. The rubber thus takes the place of the cement or luting material.

Another variation of form is as follows: I make the vessel-mouth with a narrow circumferential groove, as in Fig. 9. A strip of tin or other suitable material is cut to such a length as to fit somewhat loosely the outside circumference of the vessel and having the bottom edge turned inward to form a flange which can enter the groove. The latter having been filled with cement, the band $b$ is put on and its flange pressed into the cement in the groove, whereupon the ends of the band are brought together and soldered. Cement is then worked in between the loosely-fitting collar $b$ and the vessel, thus securing the collar firmly and making an air-tight joint. In this example the inner lid $e$ is as an example shown resting on the top of the vessel.

Instead of the grooves as above described the converse method may be adopted by having one or more projecting ribs or flanges running round the outside of the mouth of the vessel. Fig. 10 shows one such rib $i$ and Fig. 11 shows three. These ribs or flanges may be parallel or in the form of screw-threads. The band $b$ is formed correspondingly grooved and then put on and its ends soldered together, the closure being then finished in the manner described. Furthermore, it will be understood that a band of rubber or the like may be used instead of the cement or luting material between the vessel $a$ and the collar $b$. It is obvious that the hoop in this and some other hereinbefore-described cases may be provided by cutting up a tube into the desired short lengths; but as regards the forms described with reference to Figs. 5, 6, 9, 10, and 11 this mode would not conveniently apply.

In present existing methods of hermetically sealing up glass vessels, india rubber or the like is used as the medium which effects the seal between the vessel and the lid; but in my invention, whether I use cement or india rubber or the like, the seal thereby effected is between the metal collar or hoop and the vessel itself. It is not the actual sealing up of the vessel, for that is effected by fixing the outer lid to my metal collar or hoop by the common method of soldering. Furthermore, in my invention the metal collar, band, or hoop does not form an integral part of the glass or earthenware vessel as it comes from the maker, for it is not attached to nor embedded in the material of the vessel in process of manufacture of the vessel, but is subsequently fixed to or united with the vessel.

Having thus described my invention, what I claim as new therein, and desire to secure by Letters Patent, is—

1. The combination with a ceramic or glass vessel having a mouth portion provided with integral external retaining elements, of an unbroken metallic collar conformably shaped thereto and adapted to lock therewith but forming a loose fit, an intermediate impermeable cement or packing for permanently or irremovably fixing the collar air-tight to the vessel, and a metallic lid having a flange soldered permanently or irremovably to the upper portion of the collar, for the purpose specified.

2. The combination with a ceramic or glass vessel having a peripheral cut and a groove formed between the lip and cut on the exterior of the mouth of the vessel; of a metallic collar grooved to correspond to said groove on the mouth and having a turned-in edge taking into the peripheral cut, said collar thus locked to, but forming a loose fit on the vessel, a luting between the collar and jar for permanently or irremovably fixing the collar air-tight to the jar, and a suitable metallic lid for the jar having a flange capable of being soldered to said collar, substantially as set forth.

3. The combination with a ceramic or glass vessel having two exterior peripheral cuts partly through the mouth of the vessel and peripherally grooved between the cuts; of a metallic collar grooved to correspond to said grooved portion and whose edges are turned at substantially right angles to take into said cuts, thereby loosely locking the collar to the jar, an air-tight luting between the collar and jar and a metallic lid having a meeting edge capable of being soldered to said collar, substantially as set forth.

In testimony whereof I have signed my name to this specification in the presence of two subscribing witnesses.

THOMAS EVANS HARLEY.

Witnesses:
VERNON WOOD,
ADA FOSTER.